United States Patent [19]

Ueno

[11] Patent Number: 5,617,220
[45] Date of Patent: Apr. 1, 1997

[54] FACSIMILE APPARATUS

[75] Inventor: Yasuhide Ueno, Fuchu, Japan

[73] Assignee: Canon Kabushiki Kaisha, Tokyo, Japan

[21] Appl. No.: 969,361

[22] Filed: Oct. 30, 1992

[30] Foreign Application Priority Data

Nov. 7, 1991 [JP] Japan .................................. 3-291123

[51] Int. Cl.$^6$ ................................................ H04B 15/00
[52] U.S. Cl. .............................................. 358/434; 379/93
[58] Field of Search .................................. 375/8; 379/93; 358/434

[56] References Cited

U.S. PATENT DOCUMENTS

| | | | |
|---|---|---|---|
| 4,829,524 | 5/1989 | Yoshida | 371/32 |
| 4,885,755 | 12/1989 | Yoshida | 375/58 |
| 4,897,831 | 1/1990 | Negi et al. | 370/29 |
| 4,999,716 | 3/1991 | Nakamura | 358/434 |
| 5,031,179 | 7/1991 | Yoshida et al. | 371/32 |
| 5,127,013 | 6/1992 | Yoshida | 371/32 |

*Primary Examiner*—Bernard Roskoski
*Attorney, Agent, or Firm*—Fitzpatrick, Cella, Harper & Scinto

[57] ABSTRACT

In a facsimile apparatus having a V.17 MODEM, a controller examines a FIF of a received PPR. If all FIF bits are "1", the controller quickly transmits a CTC including transmission speed information by a V.21 MODEM then transmits a long training by a V.17 MODEM, transmission speed of which has been set to that indicated by the transmission speed information, and retransmits the frames required by the PPR at transmission speed of previous transmission of image information to the current retransmission or transmission speed slower than that of previous retransmission to the current retransmission. If there are any "0" bits in the FIF, the apparatus transmits a short training by the V.17 MODEM and retransmits the the frames required by the PPR at the transmission speed of the previous transmission of image information to the current transmission or transmission speed of previous retransmission to the current retransmission.

26 Claims, 8 Drawing Sheets

S Tr: SHORT TRAINING
L Tr: LONG TRAINING

S Tr: SHORT TRAINING
L Tr: LONG TRAINING

FACSIMILE APPARATUS

BACKGROUND OF THE INVENTION

The present invention relates to a facsimile apparatus which comprises a V.17 MODEM (modulator-demodulator) and performs ECM (Error Correction Mode) communication.

A conventional facsimile apparatus performs ECM communication in accordance with a procedure defined by CCITT Recommendation T.30.

A procedure of ECM transmission by a G3 (Group 3 in Classification of facsimile apparatus (Recommendation T.0)) facsimile apparatus having a V.17 MODEM will be described.

First, the G3 facsimile apparatus receives a NSF (Non-Standard Facilities), a CSI (Called Subscriber Identification) and a DIS (Digital Identification Signal) by a V 21 MODEM (300 bps), and transmits a NSS (Non-Standard Set-up), a TSI (Transmitting Subscriber Identification) and a DCS (Digital Command Signal) by the V.21 MODEM. Thereafter, the facsimile transmits a long training/TCF (Training Check) by a V.17 MODEM (14,400/12,000/9,600/7,200 bps).

After the transmission of the TCF, the facsimile apparatus receives a response from the receiving apparatus by the V.21 MODEM.

If the apparatus receives a FTT (Failure to Train) as the response, it slows transmission speed of the V.17 MODEM and repeats the transmission of the NSS, TSI and DCS by the V.21 MODEM and the transmission of the long training/ TCF by the V.17 MODEM.

If the apparatus receives a CFR (Confirmation to Receive) as the response, it continuously transmits a short training, a HDLC (High Level Data Link Control) flag sequence '01111110', a HDLC image signal and three RCP's (Return to Control for Partial Page) by the V.17 MODEM at the current transmission speed, thereafter, transmits a PPS-Q (Partial Page Signal, Q=either of MPS, EOM and EOP explained below) by the V.21 MODEM. It should be noted that the facsimile apparatus transmits as the PPS-Q:

1) a PPS -NULL,
  if the image signal transmitted to the receiving apparatus indicates a partial page.
2) if the image signal indicates a complete page,
  a) a PPS-MPS (Multi-Page Signal), if the current page is not the last page of the original.
  b) a PPS-EOM (End of Message), if the current page is the last page and the current mode is changed.
  c) a PPS-EOP (End of Procedure), if the current page is the last page and the current mode is not changed.

Then, the apparatus receives a response from the receiving apparatus by the V.21 MODEM.

If the apparatus receives a PPR (Partial Page Request) as the response, it continuously transmits a short training, HDLC flag sequence, the frames required by a FIF (Facsimile Information Field) in the PPR and a RCP and retransmits the PPS-Q by the V.21 MODEM.

Further, if the apparatus receives a MCF (Message Confirmation) as the response, it performs following procedures corresponding to the PPS-Q:

1) If the PPS-Q is PPS-NULL or PPS-MPS,
  it transmits a short training, a HDLC flag sequence, a HDLC image signal of a next partial page or a next page and a RCP by the V.17 MODEM.
2) If the PPS-Q is a PPS-EOP,
  it transmits a DCN (Disconnect) by the V.21 MODEM and releases the line to terminate the communication.
3) If the PPS-Q is a PPS-EOM,
  it returns to phase B and wait to receive a NSF, a CSI and DIS by the V.21 MODEM If the facsimile apparatus receives a PPR as a response to the PPS-Q four times, it transmits a CTC (Continue to Correct) having transmission speed information and then receives a response from the receiving apparatus by the V.21 MODEM.

If the facsimile apparatus receives a CTR (continue to Retransmit) as the response, it changes the transmission speed of the V.17 MODEM to a value set in the CTC, retransmits the long training, the frames required by the FIF in the PPR and the RCP, and continues to perform the procedure.

If the facsimile apparatus does not receive a CTR as the response, it transmits a DCN by the V.21 MODEM and releases the line to terminate the communication.

Next, a procedure of ECM reception by the G3 facsimile apparatus having the V.17 MODEM will be described below.

When the facsimile apparatus receives a call, it transmits a CED (Called Station Identification), thereafter, transmits a NSF, a CSI and a DIS by a V.21 MODEM. The apparatus receives a NSS, a TSI and a DCS from the transmitting apparatus by the V.21 MODEM and sets transmission speed of the V.17 MODEM in accordance with transmission speed information included in the received DCS to receive a long training/TCF from the transmitting apparatus.

If the facsimile apparatus does not receive the TCF correctly, it transmits a FTT by the V.21 MODEM and rereceives a NSS, a TSI and a DCS. If the facsimile apparatus receives the TCF correctly, it transmits a CFR via the V.21 MODEM and receives such as a short training, a HDLC flag sequence and a HDLC image signal. After the apparatus receives at least one RCP frame, it quits signal reception status by the V.17 MODEM.

Next, the facsimile apparatus receives a PPS-Q or a CTC by the V.21 MODEM. The apparatus performs following procedures in accordance with a received signal.

1) If a PPS-Q has been received,
  a) if there are error frames in the received image signal,
    it transmits a PPR requiring retransmission of the error frames to the transmitting apparatus by the V.21 MODEM, and then receives a short training and the error frames from the transmitting apparatus.
  b) if there is no error frame in the received image signal,
    it transmits a MCF to the transmitting apparatus by the V.21 MODEM and performs a next procedure in accordance with the received PPS-Q,
    i) if the PPS-Q is a PPS-NULL or a PPS-MPS, it receives a short training or an image signal indicative of a partial/next page by the V.17 MODEM.
    ii) if the PPS-Q is a PPS-EOM,
      it returns to the phase B after T2 (6 sec.) has passed and transmits a NSF, a CSI and a DIS by the V.21 MODEM.
    iii) if the PPS-Q is a PPS-EOP,
      it receives a DCN by the V.21 MODEM and releases the line to terminate the communication.
2) If a CTC has been received,
  it transmits a CTR by the V.21 MODEM, sets the transmission speed of the V.17 MODEM in accordance with transmission speed information included in the received CTC and receives a long training, a HDLC image signal and the like.

In the above-described conventional ECM communication protocol, if there is an error in a short training, or if there occur many errors in image signal frames, the transmitting facsimile apparatus repeats transmission of the same block till it receives a fourth PPR. The receiving apparatus receives the same block four times, cannot receive a long training nor correctly demodulate the image signal till it transmits the fourth PPR to the transmitting apparatus.

For this reason, if many errors occur in the conventional ECM communication, the communication time period is prolonged.

SUMMARY OF THE INVENTION

The present invention has been made in consideration of the above situation, and has as its object to provide a facsimile apparatus capable of performing ECM communication time which is shorter than that of the conventional ECM communication time. For this purpose, the facsimile apparatus embodying the present invention does not repeat transmission of the same block four times and allows a receiving apparatus to perform correct demodulation even if many errors occur in the communication.

According to an aspect of the present invention, a facsimile apparatus having communication facilities defined by CCITT Recommendation, comprises detection means for detecting a retransmission request from a receiving apparatus, notification means for, if said detection means detects the retransmission request, notifying the receiving apparatus of transmission speed information, training means for, if said notification means notifies the receiving apparatus of the transmission speed information, transmitting a training to the receiving apparatus in accordance with the transmission speed information, and retransmission means for retransmitting image information corresponding to the retransmission request detected by said detection means after the training by said training means.

Further, a facsimile apparatus having communication facilities defined by CCITT Recommendation according to the present invention, comprises detection means for detecting a retransmission request from a receiving apparatus, determination means for determining an error status from the retransmission request detected by said detection means, notification means for notifying the receiving apparatus of transmission speed information in accordance with the error status determined by said determination means, training means for, if said notification means notifies the receiving apparatus of the transmission speed information, transmitting a training to the receiving apparatus; and retransmission means for retransmitting image information corresponding to the retransmission request detected by said detection means after the training by said training means.

According to the present invention, a facsimile apparatus which can perform ECM communication within a period of time shorter than that of conventional ECM communication even if many communication errors occur during the communication can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
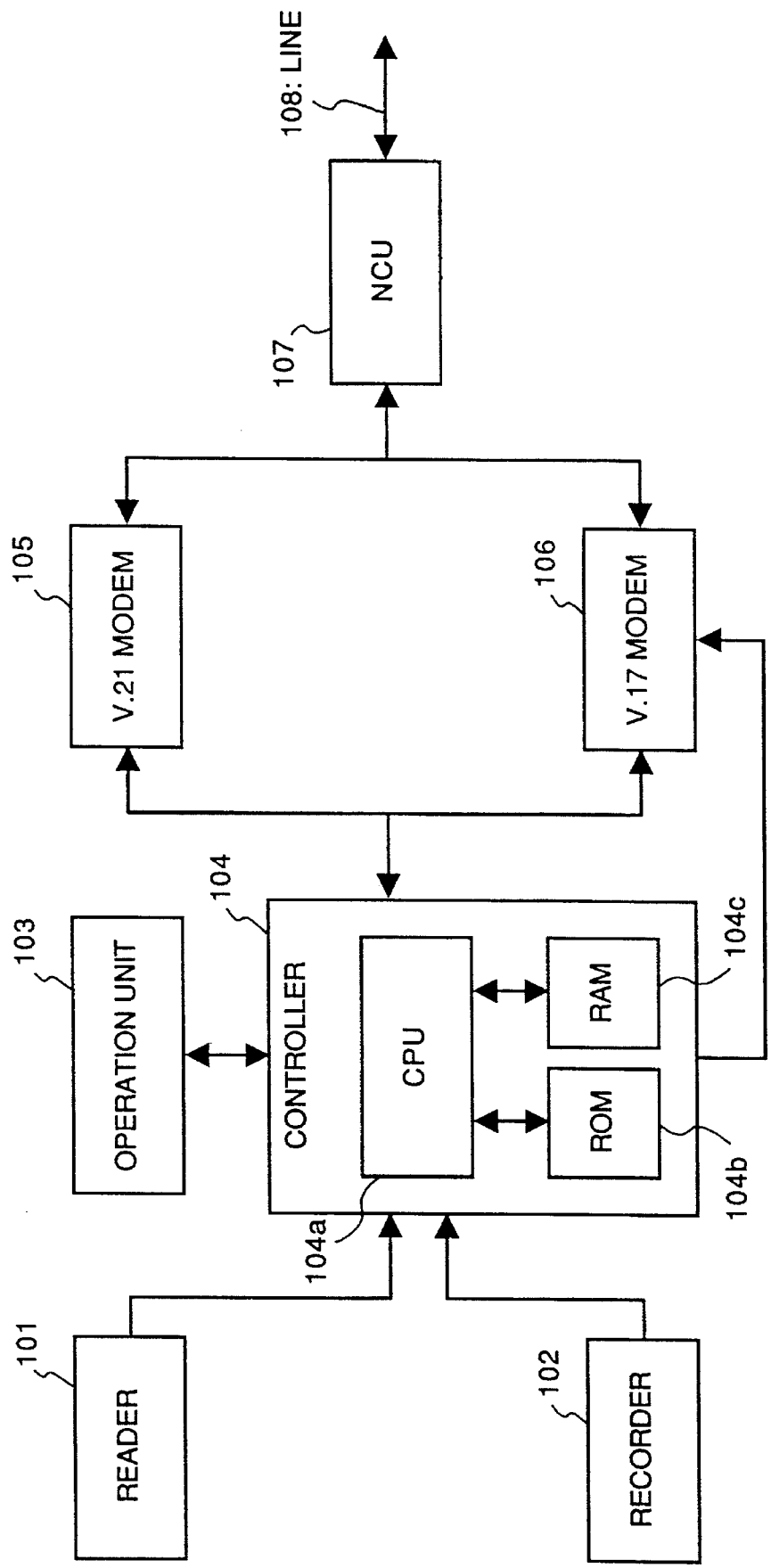
FIG. 1 is a block diagram showing a configuration of a facsimile apparatus according to an embodiment of the present invention.

FIG. 1 is a block diagram showing a configuration of a facsimile apparatus of an embodiment of the present invention.

In FIG. 1, reference numeral 101 denotes a reader constituted by such as a CCD line sensor. The reader 101 reads an original image.

Numeral 102 denotes a recorder constituted by such as a thermal printer, an electrophotographic printer and an ink-jet printer. The recorder 102 outputs such as a received image.

Numeral 103 denotes an operation unit for an operator. The operation unit 103 constituted by key-input switches such as single-touch dialling keys and ten-keys, a key-input scanning circuit and a LCD for displaying, such as status information of the apparatus.

Numeral 104 denotes a controller constituted by such as a CPU 104a, a ROM 104b and a RAM 104c. Programs, such as a control procedure to be described later, are stored in the ROM 104b. The CPU 104a controls the overall apparatus in accordance with the control procedure. Various data is temporarily stored into the RAM 104c. The controller 104 performs coding and decoding of image-signals in accordance with the programs stored in the ROM 104b in MH (Modified Huffman) coding scheme, MR (Modified READ-)coding scheme, MMR (Modified MR) coding scheme and the like, and also performs execution control (communication sequence control).

Numeral 105 denotes a V.21 MODEM (300 bps) according to CCITT Recommendation generally used in communication of procedure signals.

Numeral 106 denotes a V.17 MODEM also according to CCITT Recommendation used in communication of image signals at transmission speed of any of 14,400/12,000/9,600/7,200 bps.

Numeral 107 denotes a NCU (Network Control Unit) connected to a terminal of a line 108 for using a public data network connected to the line 108 in data communication or the like. The NCU controls such as connection of the public data network to the line 108, switching of a data communication path and maintaining of a loop. The NCU 107 is constituted by such as a CI (call identifier) detection circuit for detecting an CI (16 Hz or 1.3 kHz) from the line 108, a dial circuit for dialling in accordance with telephone number data transmitted from the controller 104 and a relay circuit for forming a direct-current loop on the line 108.

Next, control procedures of this embodiment will be described below.

FIGS. 2 to 7 are flowcharts showing examples of a transmission procedure, especially a procedure for image transmission. It should be noted that control procedures, except those as shown in FIGS. 2 to 7, are similar to the conventional procedures and therefore the explanations will be omitted.

Figure 2:
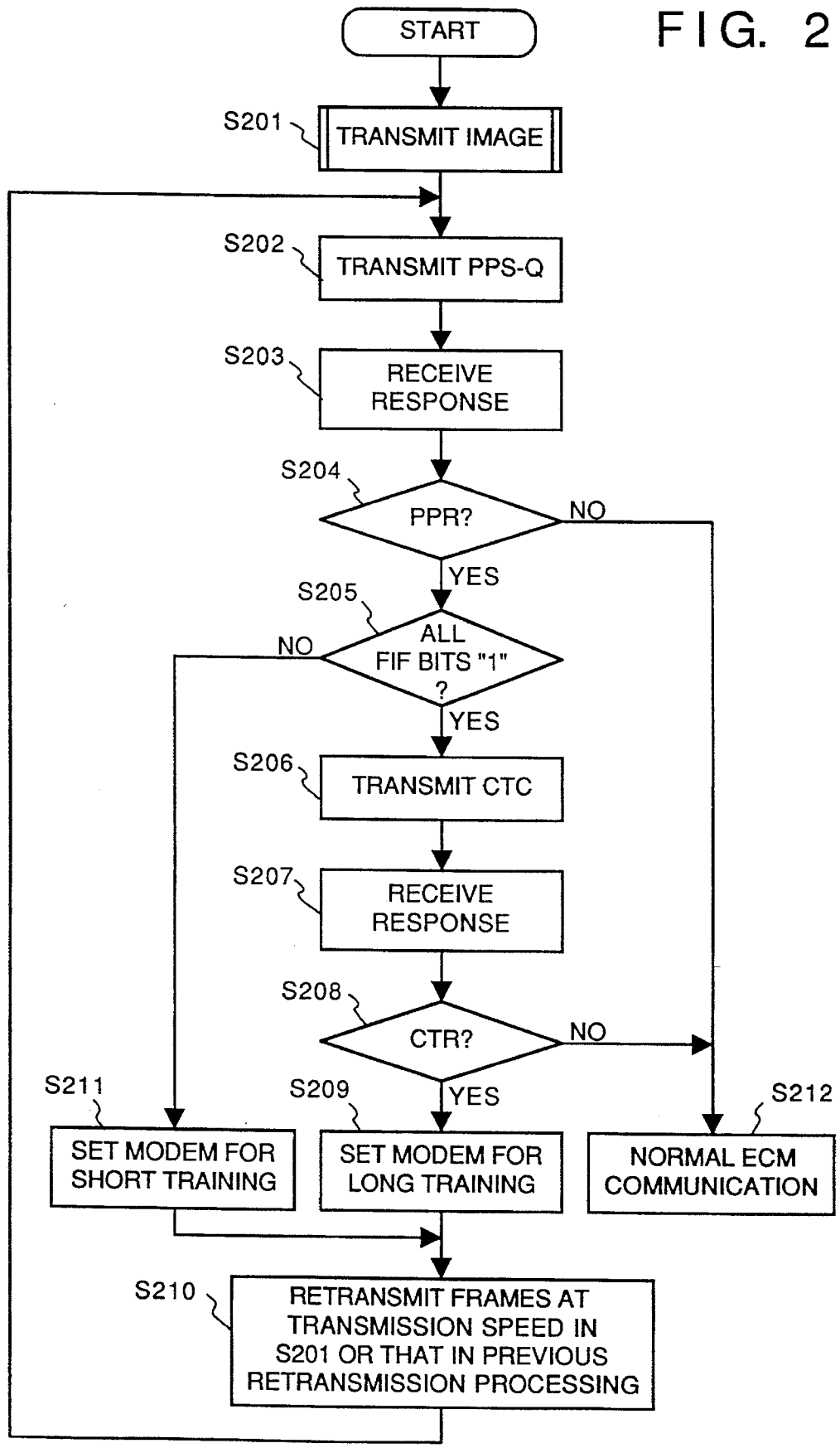
FIG. 2 is a flowchart showing an example of a transmission procedure of the embodiment.

In step S201 of FIG. 2, HDLC framing is performed to the image data read by the reader 101 in accordance with CCITT Recommendation. The data is modulated by the V.17 MODEM 106 and transmitted onto the line 108 through the NCU 107.

In step S202, a PPS-Q is transmitted by the V.21 MODEM 105, and in step S203, a response from the receiving apparatus is received by the V.21 MODEM. If any V.21 signal is received, the process proceeds to step S204.

In step S204, whether the response received in step S203 is a PPR or not is determined. If YES, the process proceeds to step S205, if NO, proceeds to step S212 to perform a normal ECM communication.

If the response is a PPR, whether all bits in a FIF included in the PPR are "1" or not is determined in step S205. If YES, the process proceeds to step S206. If the bits include a "0" bit, the process proceeds to step S211 where the V.17 MODEM 106 is set for short training, and the process advances to step S210.

If the bits in the FIF are all "1", a CTC is transmitted by the V.21 MODEM 105 in step S206, and a response from the receiving apparatus is received by the V.21 MODEM 105 in step S207. If any V.21 signal is received, the process proceeds to step S208.

In step S208, whether the response received in step S207 is a CTR or not is determined. If YES, the process proceeds to step S209, if NO, proceeds to step S212 to perform a normal ECM transmission.

If the response received in step S207 is a CTR, the V.17 MODEM 106 is set for long training in step S209.

In step S210, the frames required by the PPR received in step S203 are retransmitted at the transmission speed in step S201. Thereafter, the process returns to step S202.

More specifically, in the control procedure as shown in FIG. 2, if all the FIF bits in the received PPR are "1", i.e., errors have occurred in all the frames received by the receiving apparatus, a CTC is transmitted to perform long training and the error frames are retransmitted at the transmission speed of the previous transmission. If there is at least one "0" bit in the FIF of the received PPR, i.e., there is at least one frame received normally by the receiving apparatus, short training is performed and the error frames are retransmitted at the transmission speed of the previous transmission.

Figure 3:
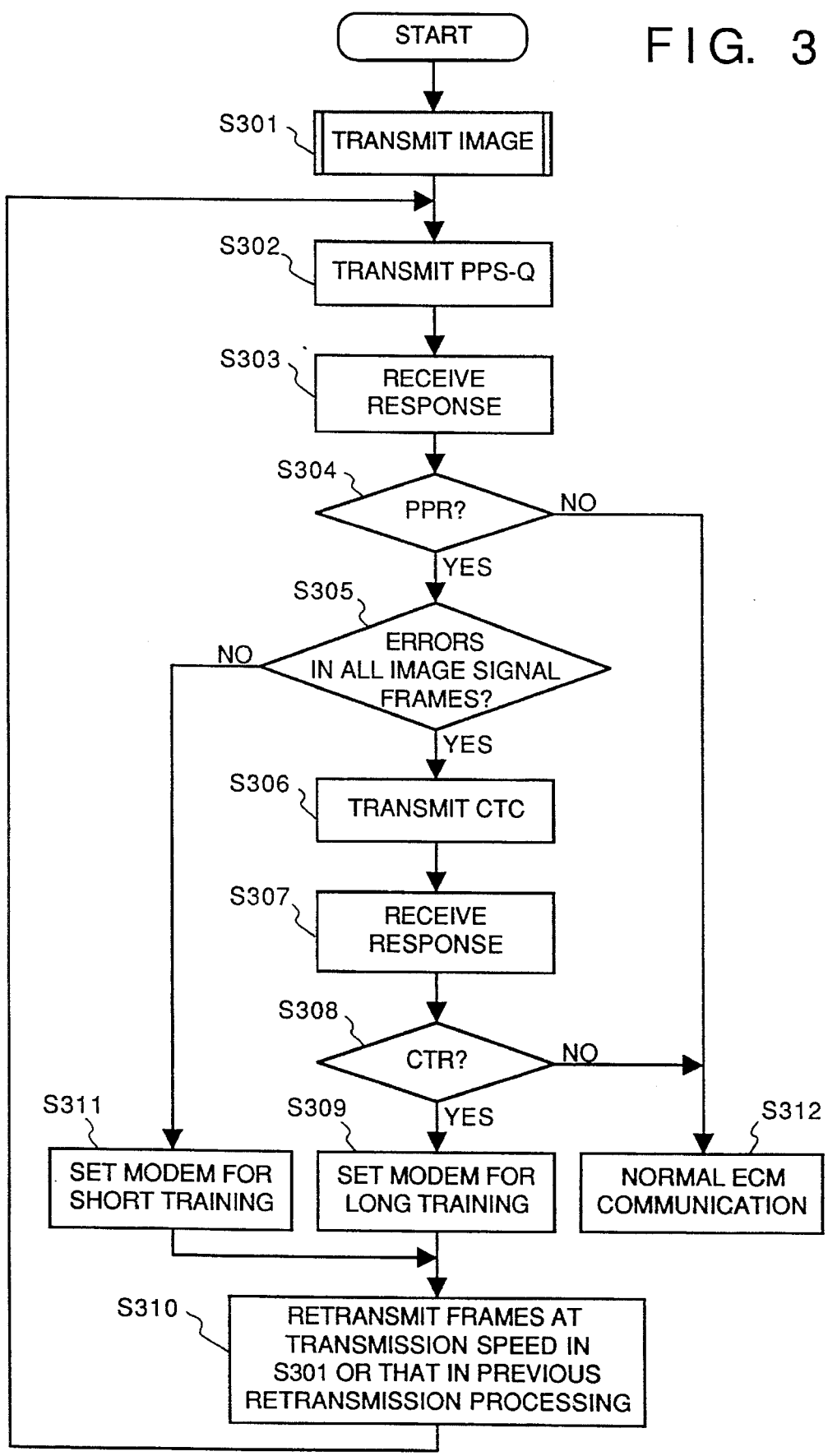
FIG. 3 is a flowchart showing a second example of the transmission procedure of the embodiment.

Next, a control procedure as shown in FIG. 3 will be described below. In FIG. 3, steps except step S305 correspond to those in FIG. 2, therefore, detailed explanations will be omitted.

In step S305, FIF bits corresponding to respective image signal frames transmitted in step S301 are examined to determine whether errors have occurred in all the image signal frames or not. If YES, the process proceeds to steps S306 to S309, if NO, proceeds to step S311. Note that the FIF is attached to a PPR received in step S303.

More specifically, in the control procedure as shown in FIG. 3, if it is determined using the FIF of the received PPR that errors have occurred in all the image signal frames received by the receiving apparatus, a CTC is transmitted to perform long training and the error frames are retransmitted at the transmission speed of the previous transmission. If it is determined that there are any image signal frames received normally by the receiving apparatus, short training is performed and the error frames are retransmitted at the transmission speed of the previous transmission.

Figure 4:
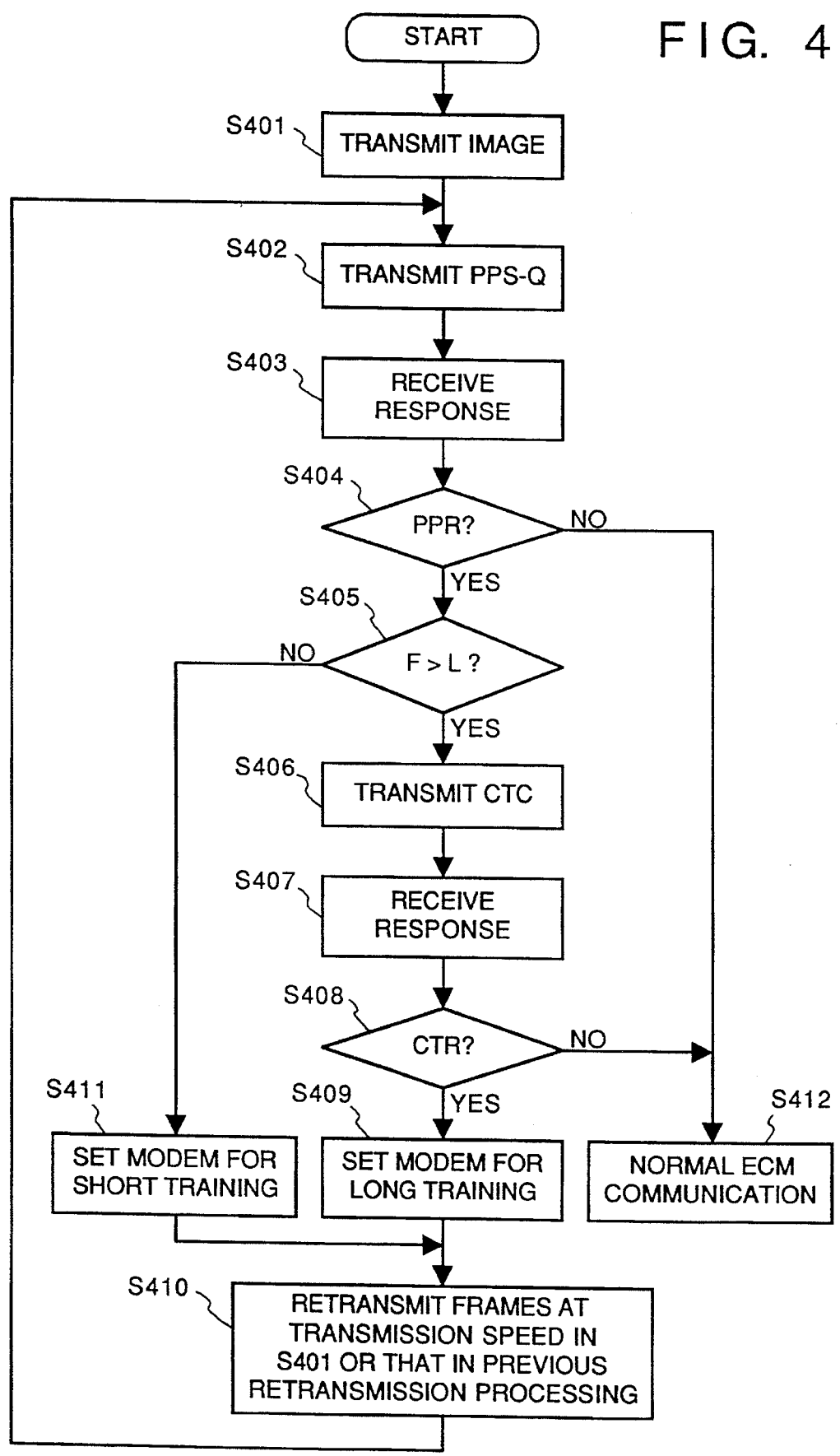
FIG. 4 is a flowchart showing a third example of the transmission procedure of the embodiment.

Next, a control procedure as shown in FIG. 4 will be described below. In FIG. 4, steps except step S405 correspond to those in FIG. 2, therefore, detailed explanations will be omitted.

In step S405, the relationship between a number F indicative of the number of "1" bits in a FIF of a PPR received in step S403 and a predetermined value L is examined. If F>L, the process proceeds to steps S406 to S409, if F≦L, proceeds to step S411.

More specifically, if it is determined using the FIF of the received PPR that the frequency of errors of the frames received by the receiving apparatus exceeds the predetermined value L, a CTC is transmitted to perform long training and the error frames are retransmitted at the transmission speed of previous transmission. If it is determined using the FIF of the received PPR that the frequency of frame errors is equal to or lower than the predetermined value L, short training is performed and the error frames are retransmitted at the transmission speed of the previous transmission.

Figure 5:
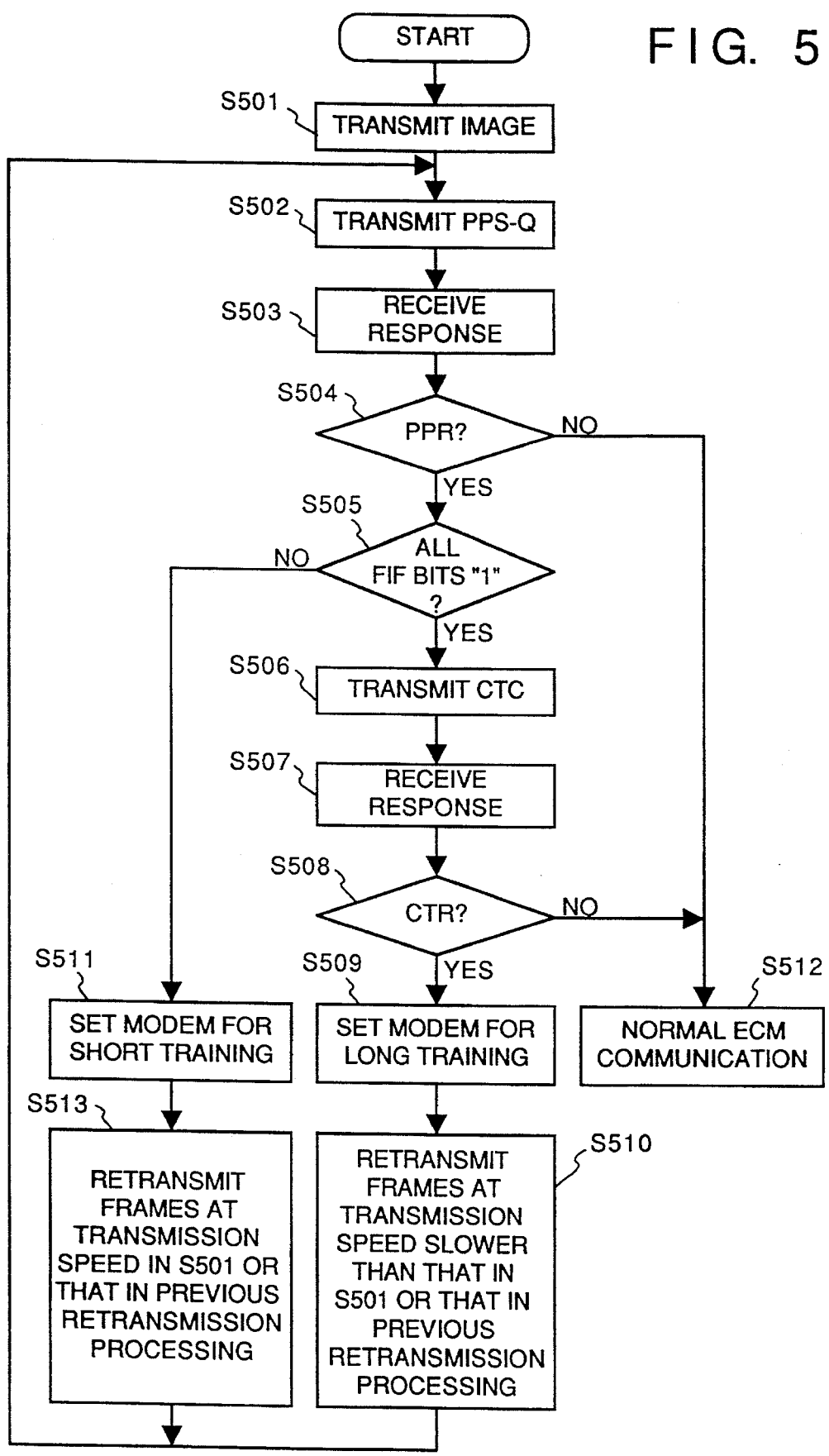
FIG. 5 is a flowchart showing a fourth example of the transmission procedure of the embodiment.

Next, a control procedure as shown in FIG. 5 will be described below. In FIG. 5, steps except steps S510 and S513 correspond to those in FIG. 2, therefore detailed explanations will be omitted.

If it is determined using a FIF of the received PPR that all the bits in the FIF are "1" in step S505, the process proceeds to steps S506 to S510. In step S509, long training is performed and the frames required by the PPR received in step S503 are retransmitted at the transmission speed in step S501 or transmission speed slower than that of previous retransmission in step S510. If it is determined that there are any frames received normally by the receiving apparatus, short training is performed in step S511 and the error frames are retransmitted at the transmission speed in step S501 or that of previous retransmission in step S513.

Figure 6:
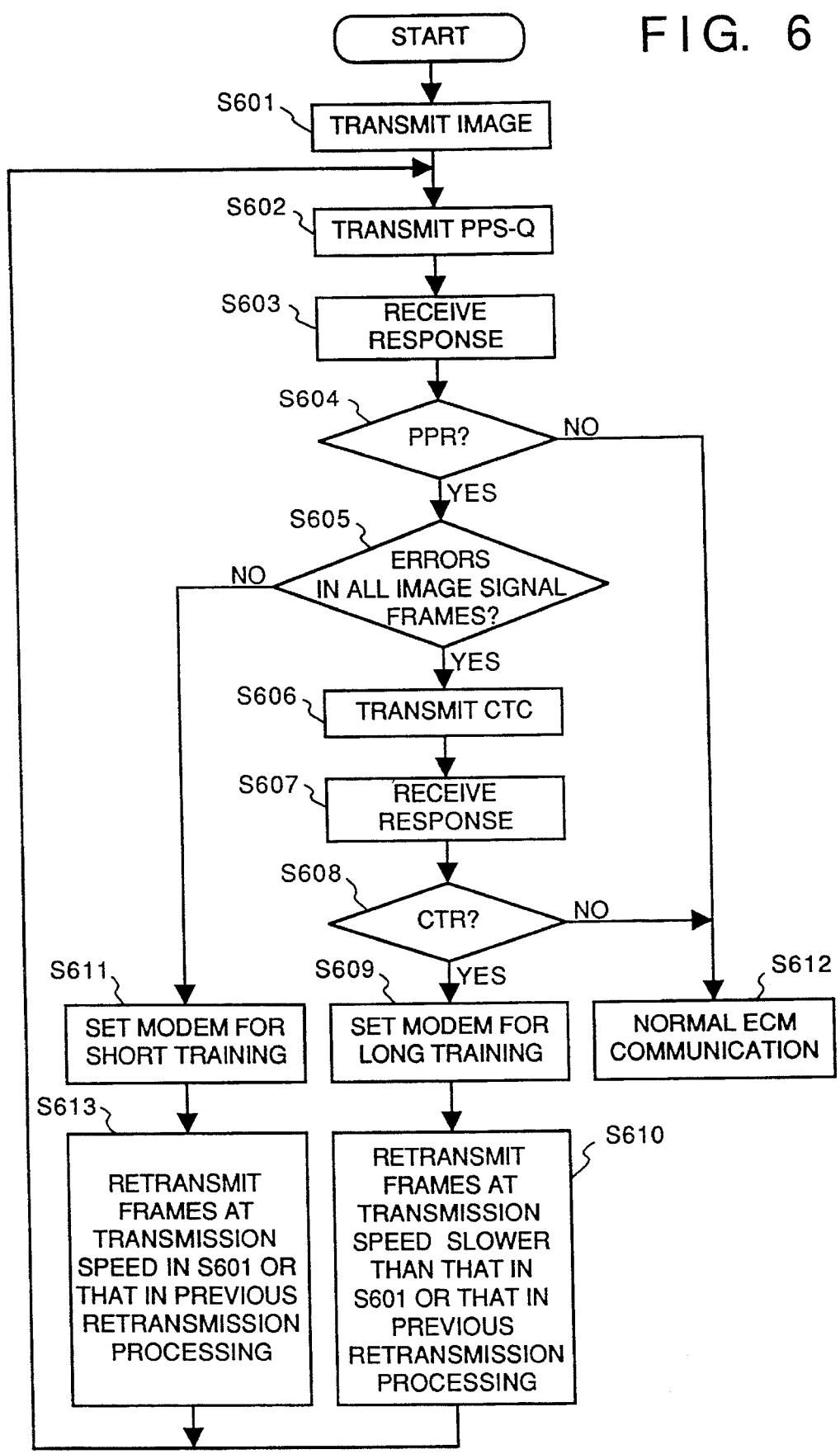
FIG. 6 is a flowchart showing a fifth example of the transmission procedure of the embodiment.

Next, a control procedure as shown in FIG. 6 will be described below. In FIG. 6, steps except step S605 correspond to those in FIG. 5, therefore, detailed explanations will be omitted.

In step S605, FIF bits corresponding to respective image signal frames transmitted in step S601 are examined to determine whether errors have occurred in all the image signal frames transmitted in step S601. If YES, the process proceeds to steps S606 to S610, if NO, proceeds to step S611 and S613. Note that the FIF is attached to a PPR received in step S603.

More specifically, in the control procedure as shown in FIG. 6, if it is determined using the FIF of the received PPR that errors have occurred in all the image signal frames received by the receiving apparatus, a CTC is transmitted to perform long training and the error frames are retransmitted at the transmission speed in step S601 or transmission speed slower than that of previous retransmission. If it is determined that there is any frames received normally by the receiving apparatus, short training is performed and the error frames are retransmitted at the transmission seed in step S601 or that of previous retransmission to the current retransmission.

Figure 7:
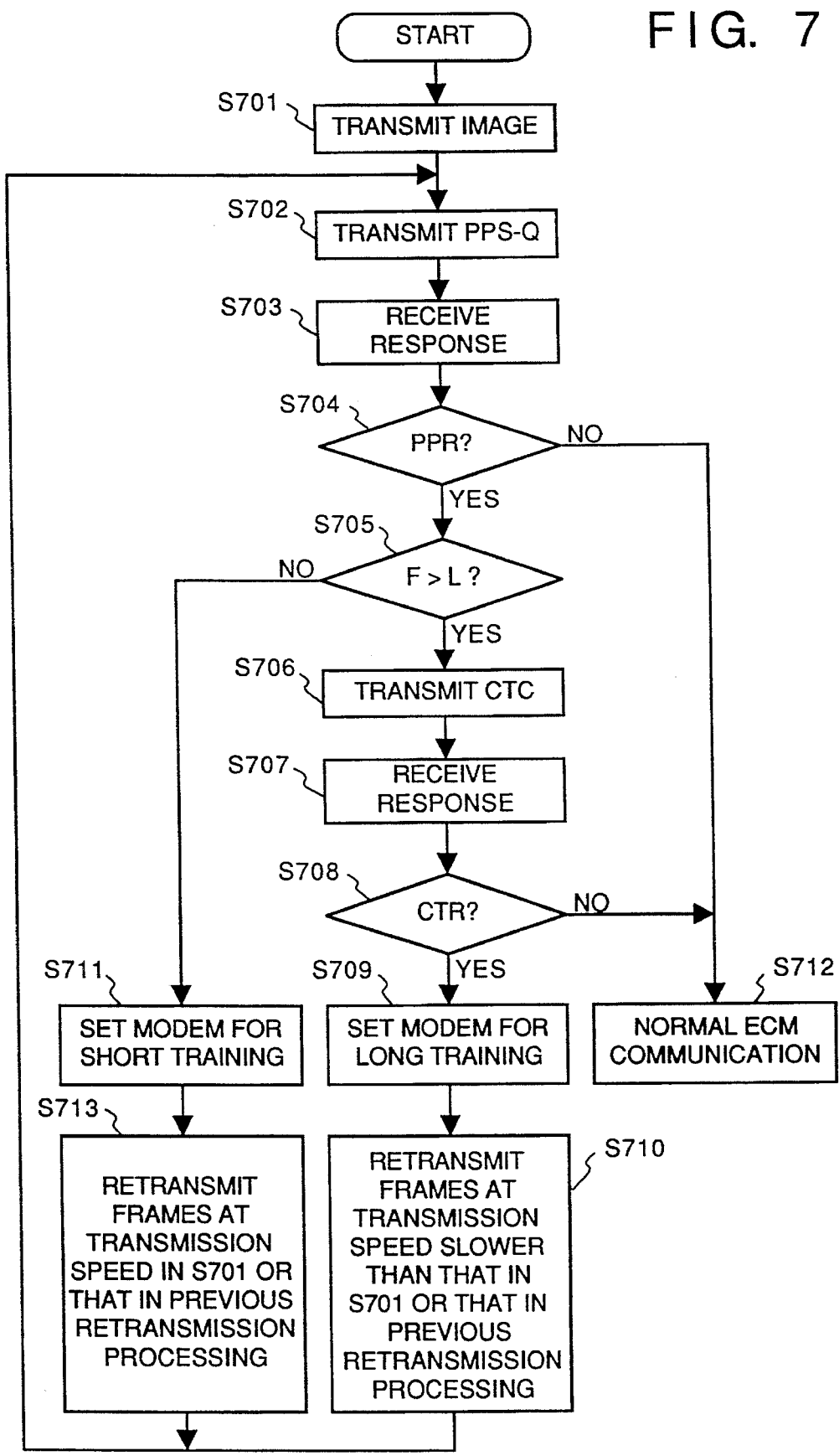
FIG. 7 is a flowchart showing a sixth example of the transmission procedure of the embodiment.

Next, a control procedure as shown in FIG. 7 will be described below. In FIG. 7, steps except step S705 correspond to those in FIG. 5, therefore, detailed explanations will be omitted.

In step S705, the relationship between a number F indicative of the number of "1" bits in a FIF(indicative of frequency errors?) of a PPR received in step S703 and a predetermined value L is examined. If F>L, the process proceeds to steps S706 to 710, if F≦L, proceeds to step S711 and S713.

More specifically, in the control procedure as shown in FIG. 7, if it is determined using the FIF of the received PPR that the frequency of errors of the frames received by the receiving apparatus exceeds the predetermined value L, a CTC is transmitted to perform long training and the error frames are retransmitted at the transmission speed in step S701 or transmission speed slower than that of previous retransmission. If it is determined that the frequency of frame errors is equal to or lower than the predetermined value L, short training is performed and the error frames are retransmitted at the transmission speed in step S701 or that of previous retransmission.

Figure 8A:
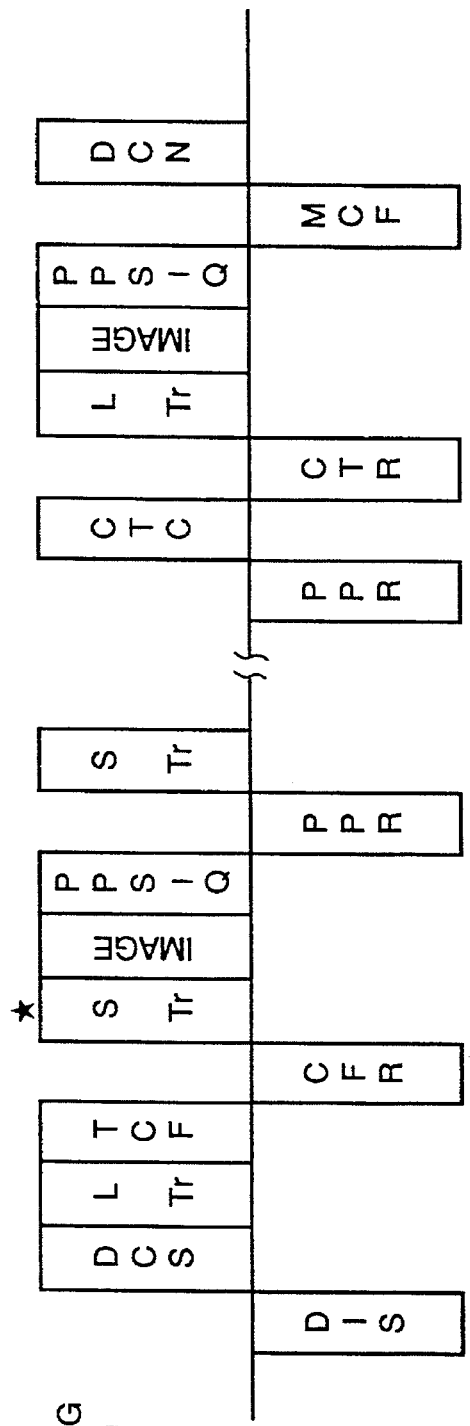
FIG. 8 is a diagram showing a conventional ECM communication.
FIG. 8B is a diagram showing an example of effects of the embodiment.
Figure 8B:
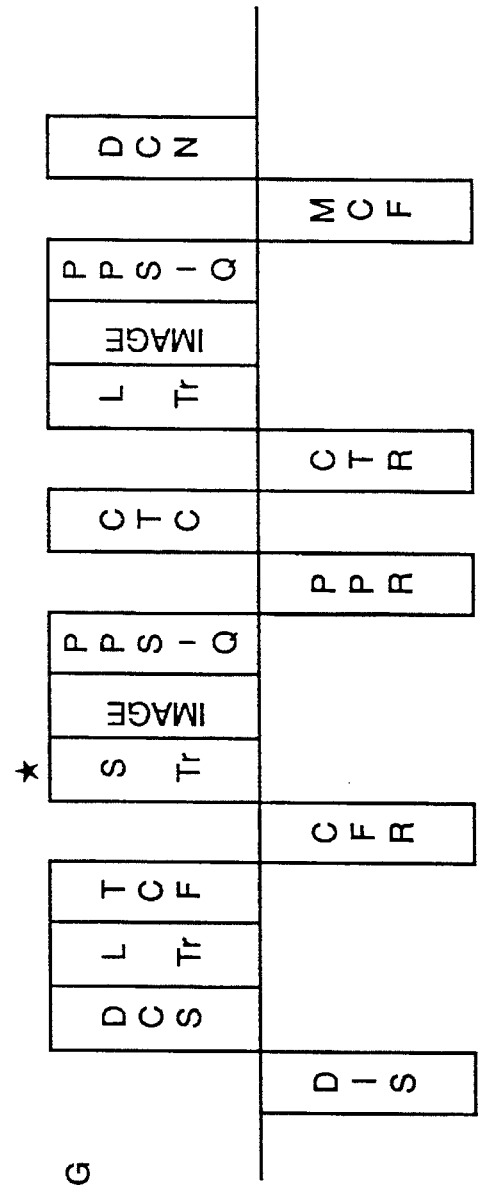

FIG. 8A shows conventional ECM communication and FIG. 8B shows an example of the effects of the embodiment. In the ECM communication as shown in FIG. 8A, if errors occur during short training indicated by "★", the transmission of the same block is repeated till the transmitting apparatus receives a fourth PPR, thereafter, a CTC is transmitted to perform long training after repeating the transmission of the same block four times.

On the other hand, the ECM communication according to the embodiment of the present invention as shown in FIG. 8B, if errors occur during short training indicated by "★" and the transmitting apparatus receives a PPR, a CTC is quickly transmitted to perform long training without repeating the transmission of the same block.

It should be noted that in the ECM communication in the embodiment, a CTC is transmitted and long training is performed in either of following cases:
(1) Errors have occurred in all the image signal frames.
(2) The frequency of errors in the image signal frames exceeds a predetermined value.

Accordingly, even if many communication errors occur, the transmission can be completed within a period shorter than that of the conventional ECM communication.

It should be noted that the control procedures as shown in FIGS. 2 to 7 are selected by a maintenance engineer in consideration of line status between an apparatus of the other end of the communication line at arranging time of a facsimile apparatus embodying the present invention.

As described above, the present invention can provide a facsimile apparatus which performs ECM communication using a V.17 MODEM, even if many errors occur during the communication, it can complete the communication within a period shorter than that in the conventional ECM communication by selecting one of the control procedures as shown in FIGS. 2 to 7 and setting the selected one procedure.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:
a modem which trains a corresponding modem in a receiving facsimile apparatus by using a long training sequence or a short training sequence before sending image data to the receiving facsimile apparatus;
receiving means for receiving a retransmission request from the receiving facsimile apparatus, the retransmission request indicating a number of errors in a reception by the receiving facsimile apparatus;
analyzing means for determining the number of errors from the retransmission request received by said receiving means; and
selecting means for selecting the long training sequence of said modem if the number of errors determined by said analyzing means exceeds a predetermined value or the short training sequence of said modem if the number of errors determined by said analyzing means is smaller than the predetermined value, said modem performing the selected training sequence.

2. The apparatus according to claim 1, further comprising changing means for changing a transmission speed of said modem in accordance with the number of errors determined by said analyzing means.

3. The apparatus according to claim 2, wherein said changing means changes the transmission speed so as to be slower than that of a previous transmission of the image data.

4. The apparatus according to claim 1, wherein the retransmission request includes information for specifying image data frames to be retransmitted, and said analyzing means analyzes the information included in the retransmission request.

5. The apparatus according to claim 4, wherein the information includes a plurality of bit information, each of the information indicating each of the image data frames to be retransmitted, and
said analyzing means analyzes a pattern of the plurality of bit information.

6. The apparatus according to claim 5, wherein said selecting means selects the long training sequence in a case where a number of the image data frames to be retransmitted is greater than the predetermined value.

7. The apparatus according to claim 5 wherein said selecting means selects the long training sequence in a case where the bit information indicates the retransmission of all of the image data frames.

8. A facsimile apparatus comprising:
a modem, including transmitting means, which trains a corresponding modem in a receiving facsimile apparatus by using a long training sequence or a short training sequence before transmitting image data to the receiving facsimile apparatus by said transmitting means;
receiving means for receiving a retransmission request from the receiving facsimile apparatus, the retransmission request indicating a number of errors in a reception by the receiving facsimile apparatus;
analyzing means for determining the number of errors from the received retransmission request;
selecting means for selecting the long training sequence of said modem if the number of errors determined by said analyzing means exceeds a predetermined value or the short training sequence of said modem if the number of errors determined by said analyzing means is smaller than the predetermined value; and
retransmission means for retransmitting the image data required by the retransmission request after performing the selected training sequence.

9. The apparatus according to claim 8, wherein the retransmission request includes a facsimile information field, and said analyzing means analyzes contents of the facsimile information field.

10. The apparatus according to claim 9, wherein the facsimile information field includes a plurality of bit information, each of the information indicating each of the image data frames to be retransmitted, and said analyzing means analyzes a pattern of the plurality of bit information.

11. The apparatus according to claim 10, wherein said selecting means selects the long training sequence in a case where a number of the image data frames to be retransmitted is greater than the predetermined value.

12. The apparatus according to claim 10, wherein said selecting means select the long training sequence in a case where the bit information indicates the retransmission of all of the image data frames.

13. The apparatus according to claim 8, further comprising changing means for changing a transmission speed of said modem in accordance with the number of errors determined by said analyzing means.

14. The apparatus according to claim 13, wherein said changing means changes the transmission speed so as to be slower than that of previous transmission of the image data.

15. A data communication apparatus comprising:

a modem, including transmitting means, which trains a corresponding modem in a receiving apparatus by using a long training sequence or a short training sequence before transmitting data frames to the receiving apparatus by said transmitting means;

receiving means for receiving a retransmission request from the receiving apparatus, the retransmission request indicating a number of errors in a reception by the receiving apparatus of the transmitted data frames;

analyzing means for determining the number of errors from the retransmission request received by said receiving means;

selecting means for selecting the long training sequence of said modem if the number of errors determined by said analyzing means exceeds a predetermined value or the short training sequence of said modem if the number of errors determined by said analyzing means is smaller than the predetermined value; and retransmission means for retransmitting the data frames indicated by the retransmission request after performing the selected training sequence.

16. The apparatus according to claim 15, further comprising changing means for changing a transition speed of said modem in accordance with the number of errors determined by said analyzing means.

17. The apparatus according to claim 16, wherein said changing means changes the transmission speed so as to be slower than that of previous transmission of the data frames.

18. The apparatus according to claim 15, wherein the retransmission request includes a plurality of bit information, each of the information indicating each of the image data frames to be retransmitted, and said analyzing means analyzes a pattern of the plurality of bit information.

19. The apparatus according to claim 18, wherein said selecting means selects the long training sequence in a case where a number of the data frames to be retransmitted is greater than the predetermined value.

20. The apparatus according to claim 18, wherein said selecting means selects the long training sequence in a case where the bit information indicates the retransmission of all of the data frames.

21. A data communication method utilizing a long training sequence or a short training sequence to train a corresponding modem in a receiving apparatus before transmitting data to the receiving apparatus, said method comprising the steps of:

a transmitting step of transmitting data frames;

a receiving step of receiving a retransmission request from the receiving apparatus, the retransmission request indicating a number of errors in a reception by the receiving apparatus of the transmitted data frames;

an analyzing step of determining the number of errors from the retransmission request received in said receiving step;

a selecting step of selecting the long training sequence if the number of errors determined in said analyzing step exceeds a predetermined value or the short training sequence if the number of errors determined in said analyzing step is smaller than the predetermined value; and a retransmission step of retransmitting the data frames indicated by the retransmission request after performing the selected training sequence.

22. The method according to claim 21, further comprising a changing step of changing a transmission speed in accordance with the number of errors determined in said analyzing step.

23. The method according to claim 22, wherein, in said changing step, the transmission speed is changed to be slower than that of a previous transmission of the data frames.

24. The method according to claim 21, wherein the retransmission request includes a plurality of bit information, each of the information indicating each of the image data frames to be retransmitted, and a pattern of the plurality of bit information is analyzed at said analyzing step.

25. The method according to claim 24, wherein the long training sequence is selected in said selecting step in a case where a number of the data frames to be retransmitted is greater than the predetermined value.

26. The method according to claim 24, wherein the long training sequence is selected at said selecting step in a case where the bit information indicates the retransmission of all of the data frames.

* * * * *

UNITED STATES PATENT AND TRADEMARK OFFICE
CERTIFICATE OF CORRECTION

PATENT NO. : 5,617,220
DATED : April 1, 1997
INVENTOR(S) : YASUHIDE UENO

Page 1 of 3

It is certified that error appears in the above-identified patent and that said Letters Patent is hereby corrected as shown below:

On the title page:

AT [56] REFERENCES CITED

U.S. PATENT DOCUMENTS

Insert: "4,153,916   5/8/79    Miwa et al.   358/257
         5,050,004   9/17/91   Morton, Jr.   358/405"

FOREIGN PATENT DOCUMENTS

Insert: "0198396   10/22/86   European Pat. Off.
         2621763   4/14/89    European Pat. Off."

OTHER PUBLICATIONS

Insert: "OCITT The International Telegraph and Telephone Consultative Committee, "A 2-Wire Modem For Facsimile Applications With Rates Up to 14400 bit/s", V. 17, Geneva, 1991."

AT [57] ABSTRACT

Line 13, "the the" should read --the--.

COLUMN 2

Line 5, "wait" should read --waits--; and
Line 32, "rereceives" should read --re-receives--.

UNITED STATES PATENT AND TRADEMARK OFFICE
CERTIFICATE OF CORRECTION

PATENT NO. : 5,617,220
DATED : April 1, 1997
INVENTOR(S) : YASUHIDE UENO

Page 2 of 3

It is certified that error appears in the above-identified patent and that said Letters Patent is hereby corrected as shown below:

COLUMN 3

Line 6, before "cannot" insert --and--.

COLUMN 4

Line 17, "FIG. 8" should read --FIG. 8A--; and
Line 49, "image-signals" should read --image signals--.

COLUMN 6

Line 67, "is" should read --are--.

COLUMN 7

Line 2, "seed" should read --speed--;
Line 13, "710," should read --S710,--; and
Line 43, "following" should read --the following--.

COLUMN 8

Line 43, "claim 5" should read --claim 5,--.

UNITED STATES PATENT AND TRADEMARK OFFICE
CERTIFICATE OF CORRECTION

PATENT NO. : 5,617,220
DATED : April 1, 1997
INVENTOR(S) : YASUHIDE UENO

It is certified that error appears in the above-identified patent and that said Letters Patent is hereby corrected as shown below:

COLUMN 9

Line 16, "select" should read --selects--; and
　　Line 50, "transition" should read --transmission--.

COLUMN 10

Line 54, "at" should read --in--.

Signed and Sealed this

Fourteenth Day of October, 1997

Attest:

BRUCE LEHMAN

Attesting Officer　　Commissioner of Patents and Trademarks